US012777394B2

(12) United States Patent
Long

(10) Patent No.: US 12,777,394 B2
(45) Date of Patent: Oct. 27, 2026

(54) METHODS AND SYSTEMS FOR STEERING OF ROAMING

(71) Applicant: Telefonaktiebolaget LM Ericsson (publ), Stockholm (SE)

(72) Inventor: Hongxia Long, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 311 days.

(21) Appl. No.: 18/682,235

(22) PCT Filed: Aug. 9, 2022

(86) PCT No.: PCT/EP2022/072355
§ 371 (c)(1),
(2) Date: Feb. 8, 2024

(87) PCT Pub. No.: WO2023/017036
PCT Pub. Date: Feb. 16, 2023

(65) Prior Publication Data

US 2024/0414619 A1 Dec. 12, 2024

(30) Foreign Application Priority Data

Aug. 9, 2021 (WO) ................ PCT/CN2021/111555

(51) Int. Cl.
*H04W 36/32* (2009.01)
*H04W 36/24* (2009.01)
*H04W 84/04* (2009.01)

(52) U.S. Cl.
CPC ....... *H04W 36/322* (2023.05); *H04W 36/249* (2023.05); *H04W 84/042* (2013.01)

(58) Field of Classification Search
USPC .... 370/230.1, 236, 241, 252, 328, 329, 330, 370/331
See application file for complete search history.

(56) References Cited

U.S. PATENT DOCUMENTS

2022/0264283 A1* 8/2022 Won ...................... H04W 8/205
2022/0312360 A1* 9/2022 Kuppelur .............. H04W 60/04
2023/0068860 A1* 3/2023 Sun ....................... H04W 48/14

FOREIGN PATENT DOCUMENTS

WO 2021/089688 A1 5/2021

OTHER PUBLICATIONS

International Search Report and Written Opinion issued in International Application No. PCT/EP2022/072355 dated Nov. 23, 2022 (18 pages).

(Continued)

*Primary Examiner* — Nguyen H Ngo
(74) *Attorney, Agent, or Firm* — Rothwell, Figg, Ernst & Manbeck, P.C.

(57) ABSTRACT

A method (600) performed by a Steering of Roaming Application Function, SOR-AF. The method includes receiving a roaming status reporting notify message from a Unified Data Management, UDM. The notify message comprises roaming status reporting information including a new serving Public Land Mobile Network, PLMN, Identifier, an access type of a User Equipment for accessing the new serving PLMN identified by the PLMN Id, and a roaming indication indicating the new serving PLMN is different from the Home PLMN or not. The method further includes generating an updated steering of roaming information based on the received roaming status reporting information including at least the access type; and transmitting to the UDM a parameter provision update request message. The update request message comprises the updated steering of roaming information.

17 Claims, 7 Drawing Sheets

(56) References Cited

OTHER PUBLICATIONS

Nokia et al., "Pseudo-CR on Nsoraf services, resources, data model", 3GPP TSG-CT WG4 Meeting #96e, C4-200759, E-Meeting, Feb. 17-28, 2020 (23 pages).
3GPP TS 23.502 V17.1.0 (Jun. 2021) (287 pages).
3GPP TS 23.122 V17.3.0 (Jun. 2021) (102 pages).
3GPP TS 22.011 V17.3.0 (Dec. 2020) (33 pages).
3GPP TS 22.261 V18.3.0 (Jun. 2021) (91 pages).
3GPP TS 29.503 V17.3.0 (Jun. 2021) (403 pages).

* cited by examiner

METHODS AND SYSTEMS FOR STEERING OF ROAMING

CROSS REFERENCE TO RELATED APPLICATIONS

This application is a 35 U.S.C. § 371 National Stage of International Patent Application No. PCT/EP2022/072355, filed 2022 Aug. 9, which claims priority to International Patent Application No. PCT/CN2021/111555, filed on 2021 Aug. 9, which are incorporated by this reference.

TECHNICAL FIELD

The present disclosure generally relates to the technical field of telecommunication, and particularly to methods, Steering of Roaming Application Function (SOR-AF) entity, Unified Data Management (UDM) entity for steering of roaming and corresponding readable media.

BACKGROUND

The 3rd Generation Partnership Project (3GPP) provides a Steering of Roaming mechanism to allow home operators to direct traffic to the roaming partners with which they have the best agreements. 3GPP TS 22.011 V17.3.0 (2020-12) ("TS 22.011") describes, among many other things, that it shall be possible for the Home Public Land Mobile Network (HPLMN) at any time to direct a User Equipment (UE), that is in automatic mode, to search for a specific Visited Public Land Mobile Network (VPLMN) and, if it is available, move to that VPLMN as soon as possible. This VPLMN shall then be regarded as the highest priority VPLMN as defined by the operator, though any Equivalent HPLMN (EHPLMN) or PLMN on the User Controlled PLMN list shall have higher priority. This process shall be done transparently and without inconvenience to the user. If the UE is in manual mode, the steering request shall be ignored. If the UE is registered on a VPLMN that is present on the User Controlled PLMN List, the steering request shall be ignored. PLMNs contained on the User Controlled PLMN List shall have priority over the steered-to-PLMN.

3GPP TS 22.261 V18.3.0 (2021-06) (TS 22.261) describes, among many other things, that steering of roaming allows the HPLMN to steer a UE to a VPLMN on which the HPLMN wants the UE to register, when the UE registers on another VPLMN. This capability may be needed for reasons e.g., reselection to a higher priority PLMN based on business arrangements. The 5th generation of cellular networks (5G) system shall support a mechanism for the HPLMN to control the timing when a UE registered on a VPLMN, in automatic mode and currently in CONNECTED mode, enters IDLE mode and initiates higher priority PLMN selection based on the type of ongoing communication.

3GPP TS 23.122 V17.3.0 (2021-06) (TS 23.122) describes, among many other things, the requirements for 5G steering of roaming over the control plane. The UE supporting N1 mode shall support the control plane solution for steering of roaming in 5G System (5GS). If the HPLMN supports and wants to use the control plane solution for steering of roaming in 5GS, then the HPLMN shall provide the steering of roaming information to the UE using the control plane mechanism. The VPLMN shall transparently relay the steering of roaming information received from the HPLMN to the UE. The UE shall be able to detect whether the VPLMN removed the steering of roaming information during the initial registration procedure in the VPLMN. The UE shall be able to detect whether the VPLMN altered the steering of roaming information. If the UE detects that the VPLMN altered or removed the steering of roaming information, then the UE shall consider the current VPLMN as the lowest priority PLMN and perform PLMN selection.

SUMMARY

Based on current 3GPP specs, if the user subscription information indicates to send the steering of roaming information due to initial registration in a VPLMN, then the HPLMN Unified Data Management (UDM) shall provide the steering of roaming information to the UE when the UE performs initial registration in a VPLMN, otherwise the HPLMN UDM may provide the steering of roaming information to the UE, based on operator policy. But there is lack of a mechanism for Steering of Roaming Application Function (SoR-AF) to decide the SOR information update based on UE roaming status event and deliver the SoR information to the UE through control plane signaling. Also, the roaming status report doesn't contain the access type used by the UE to access the serving PLMN, but which is needed as input information to generate updated SoR information. This disclosure aims to overcome these difficulties.

According to a first aspect of the present disclosure, there is provided a method performed by a SOR-AF. In one embodiment, the method includes receiving a roaming status reporting notify message which comprises roaming status reporting information from a UDM; generating an updated steering of roaming information based on the received roaming status reporting information including at least the access type; and transmitting to the UDM a parameter provision update request message which comprises the updated steering of roaming information. The roaming status reporting information includes a new serving PLMN Identifier (Id), an access type of a UE for accessing the new serving PLMN identified by the PLMN Id, and a roaming indication indicating the new serving PLMN is different from the HPLMN or not.

In an exemplary embodiment, the updated steering of roaming information comprises a new list of preferred PLMN/access technology combinations.

In an exemplary embodiment, the method further comprises generating the updated steering of roaming information is optionally based on a region area retrieved from location procedures and time-of-day.

In an exemplary embodiment, the method further comprises subscribing subscriber roaming status event from UDM for periodical reporting or one-time reporting on event detection; and receiving the roaming status reporting notify message from the UDM periodically or one-time event detection.

In an exemplary embodiment, the roaming status reporting notify message is a Nudm_EventExposure_Notify and/or the parameter provision update request message is a Nudm_ParameterProvision_Update request.

In an exemplary embodiment, the access type of the UE for accessing the new serving PLMN identified by the PLMN Id is 3rd Generation Partnership Project, 3GPP, access or non-3GPP access.

According to a second aspect of the present disclosure, there is provided a method performed by a UDM. In one embodiment, the method includes sending a roaming status reporting notify message to SOR-AF wherein the notify message comprises roaming status reporting information; receiving from the SOR-AF a parameter provision update request message wherein the update request message comprises the updated steering of roaming information which is generated by SOR-AF based on the roaming status reporting information including at least the access type; and transmitting the updated steering of roaming information to the UE via Access and Mobility management Function, AMF. The roaming status reporting information includes a new serving PLMN Id, an access type of a UE for accessing the new serving PLMN identified by the PLMN Id, and a roaming indication indicating the new serving PLMN is different from the HPLMN or not.

In an exemplary embodiment, the updated steering of roaming information comprises a new list of preferred PLMN/access technology combinations.

In an exemplary embodiment, the method further comprises receiving subscriber roaming status event subscription request from SOR-AF for periodical reporting or one time reporting on event detection; and sending the roaming status reporting notify message to SOR-AF periodically or one time on event detection.

In an exemplary embodiment, the roaming status reporting notify message is a Nudm_EventExposure_Notify and/or the parameter provision update request message is a Nudm_ParameterProvision_Update request.

In an exemplary embodiment, the access type of a UE for accessing the new serving PLMN identified by the PLMN Id is 3GPP access or non-3GPP access.

In the third aspect there is provided a computer program comprising instructions which when executed by processing circuitry of a network node causes the network node to perform any one of the methods disclosed herein.

In fourth aspect there is provided a carrier containing the computer program, wherein the carrier is one of an electronic signal, an optical signal, a radio signal, and a computer readable storage medium.

In fifth aspect there is provided a network node, where the network node is configured to perform any one of the methods disclosed herein. In some embodiments, the network node includes processing circuitry and a memory containing instructions executable by the processing circuitry, whereby the network node is configured to perform any one of the methods disclosed herein.

According to the above technical solutions of the present disclosure, an event-based method and system are provided for operator controlled SoR information update to the UE through control plane signaling; and the access type used by the UE to access the serving PLMN is included in the roaming status reporting information. The SOR-AF generates the updated SoR information based on the information at least including access type and optimizes the steering of roaming.

BRIEF DESCRIPTION OF THE DRAWINGS

The accompanying drawings, which are incorporated herein and form part of the specification, illustrate various embodiments.

DETAILED DESCRIPTION

Figure 1:
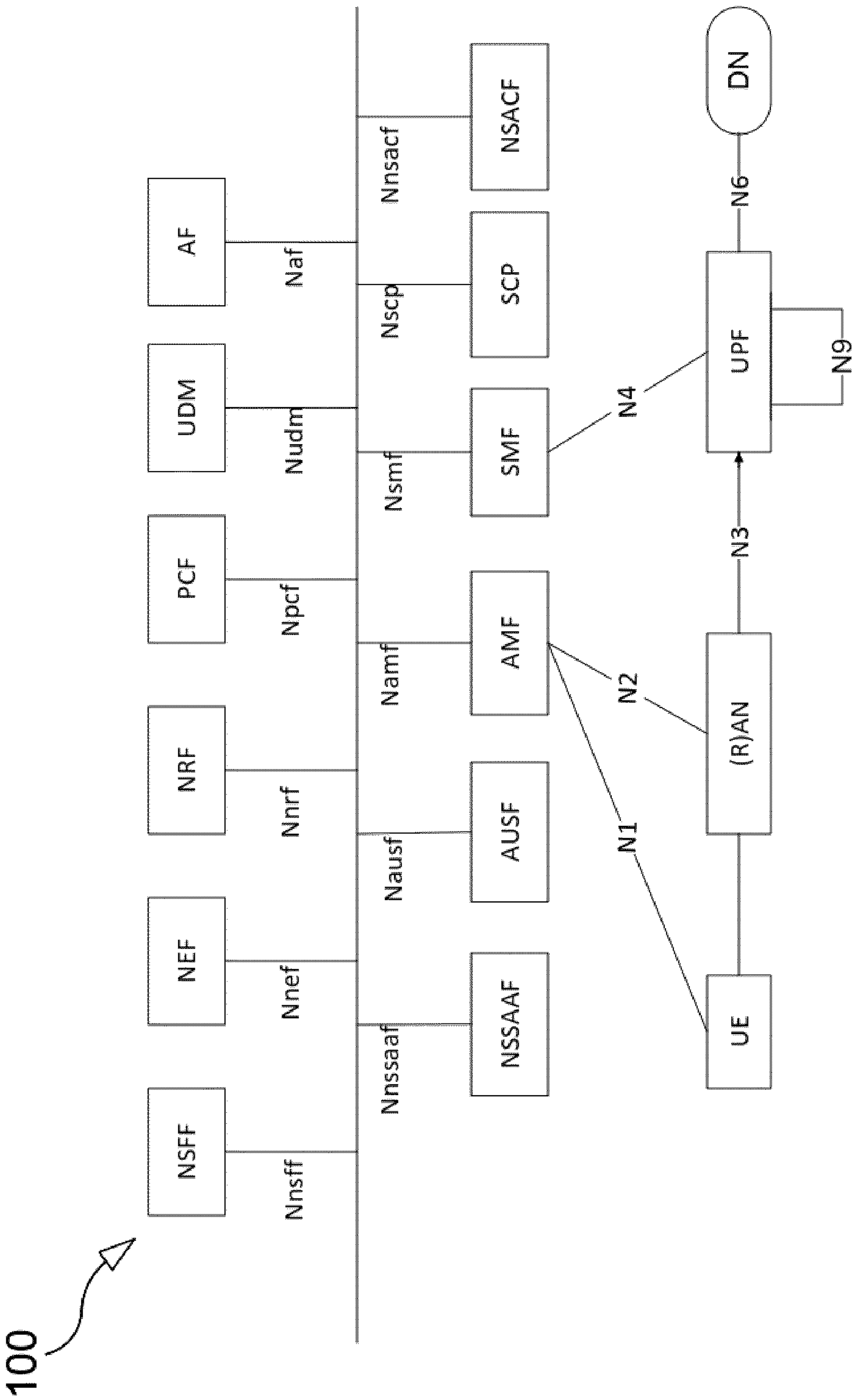
FIG. 1 illustrates an exemplifying wireless communication system.

FIG. 1 illustrates an exemplifying wireless communication system 100 represented as a 5G network architecture that uses service-based interfaces (SBIs). Communication system 100 comprises an Access network (AN) (e.g., a 5G Access Network (5G-AN), which is an access network comprising a Next Generation (NG) Radio Access Network (NG-RAN) and/or a non-3GPP access network connecting to a 5G Core Network)) and a Core network (CN) comprising network entities (NEs) in the form of Network Functions (NFs). Typically, the AN comprises base stations, e.g., such as evolved Node Bs (eNBs) or 5G base stations (gNBs) or similar. As shown in FIG. 1, user equipments (UEs) connect to an AN as well as an Access and Mobility Management Function (AMF). As further shown in FIG. 1, the 5G CN NFs include: a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF), a Network Exposure Function (NEF), a Network Slice-Specific Authentication and Authorization Function (NSSAAF), a Service Communication Proxy (SCP), a Network Slice Admission Control Function (NSACF), a User Plane Function (UPF) and a Network Repository Function (NRF). The Data network (DN), not part of the 5G core network, provides Internet access or operator services and similar.

The NFs in the 5G core network architecture are independent modularized functions, which allows independent evolution and scaling. Modularized function design enables the 5G core network to support various services in a flexible manner. Each NF in the core network interacts with another NF directly, but it is possible to use intermediate functions to route messages from one NF to another NF.

It should be understood that a network function, network node or network entity described herein can be implemented either as a network element on a dedicated hardware, as a software instance running on a dedicated hardware, or as a virtualized function instantiated on an appropriate platform, e.g., on a cloud infrastructure.

The service(s) that an NF provides to other authorized NFs can be exposed to the authorized NFs through an SBI. In FIG. 1, the SBIs are indicated by the letter "N" followed by the name of the NF, e.g., Namf for the SBI of the AMF and Nsmf for the SBI of the SMF etc.

Figure 2:
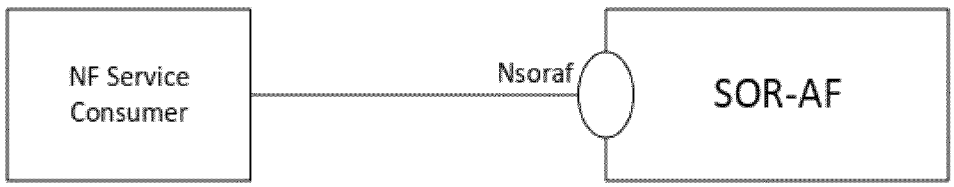
FIG. 2 illustrates a reference architecture according to an embodiment.
Figure 3:
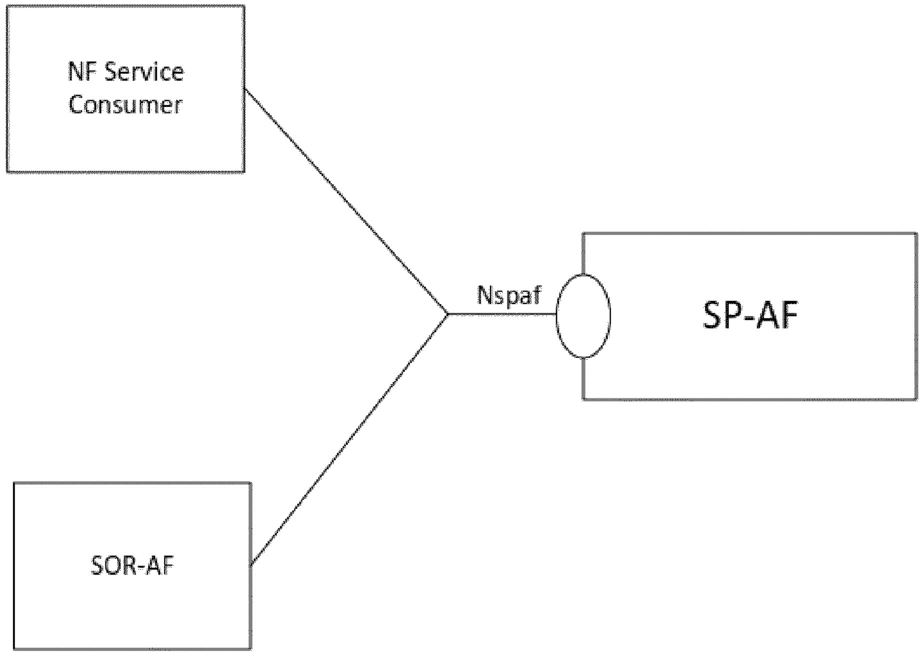
FIG. 3 illustrates a reference model according to an embodiment.

Steering of Roaming (SOR) is a technique whereby a roaming UE is encouraged to roam to a preferred roamed-to-network indicated by the HPLMN. Steering of Roaming application function (SOR-AF) is an application function that can provide UDM with list of preferred PLMN/access technology combinations and/or secured packet generated dynamically based on operator specific data analytics solutions. Within the 5GC, the SOR-AF provides services to NF service consumers (e.g., UDM) via the Nsoraf service based interface as FIG. 2 depicted. Within the 5GC, the Secured Packet Application Function (SP-AF) offers services to the UDM and to the SOR-AF via the Nspaf service based interface as FIG. 3 depicted. The UDM or SOR-AF shall make use of the SP-AF services when it needs to protect UE parameters for which the final consumer is the Universal Subscriber Identity Module (USIM).

Figure 4:
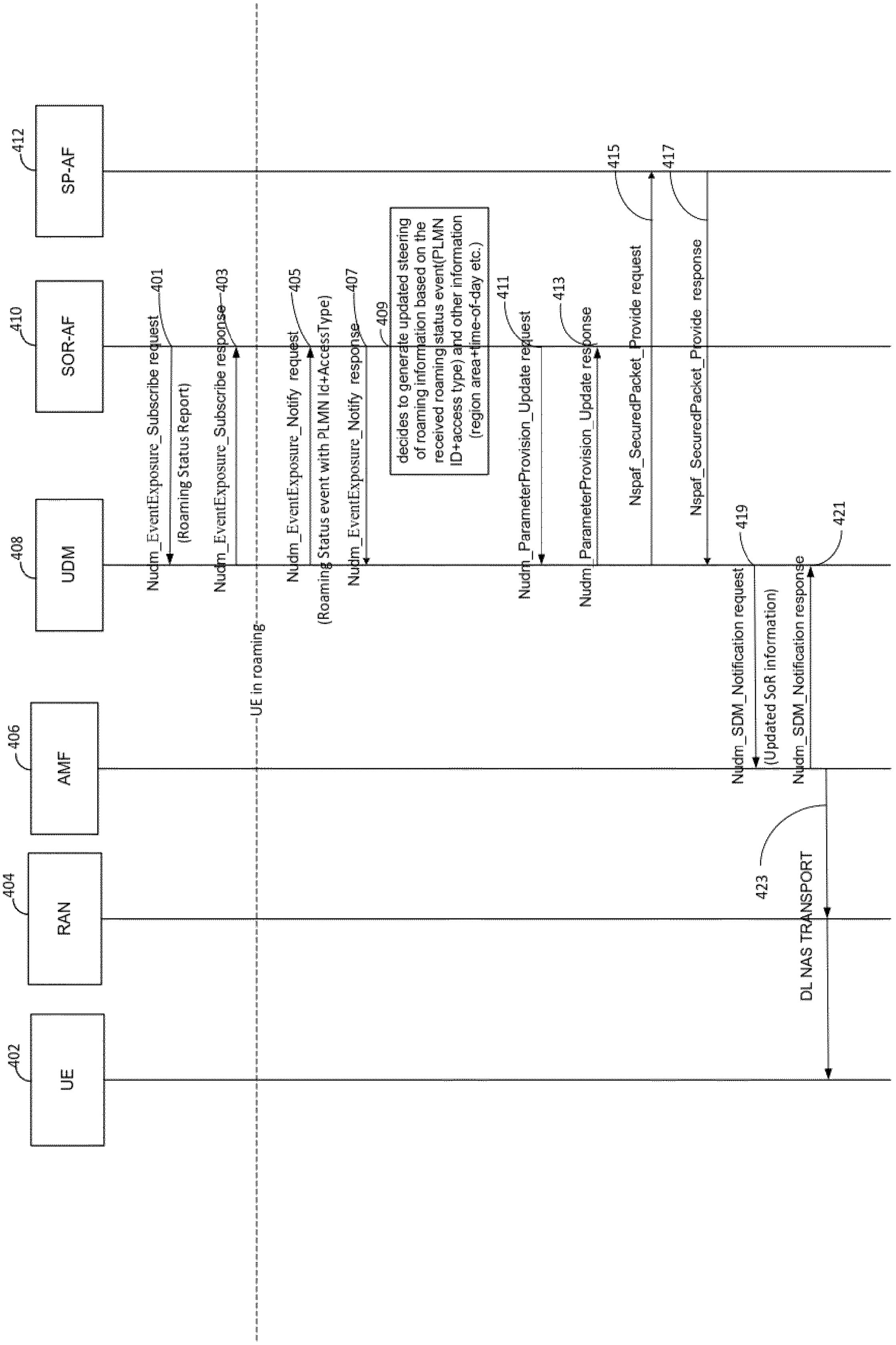
FIG. 4 is a message flow diagram illustrating a message flow according to an embodiment.
Figure 5:
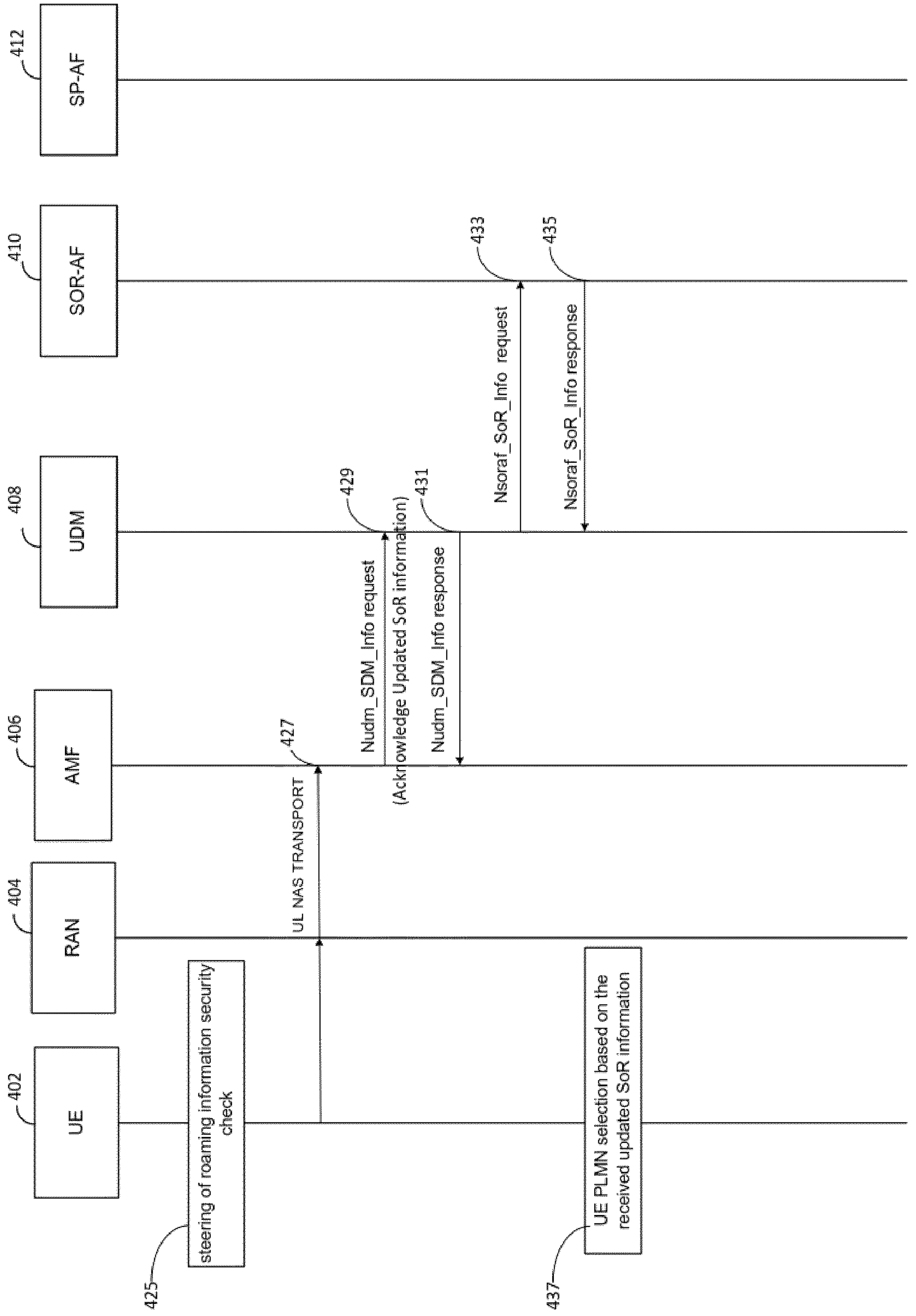
FIG. 5 is a message flow diagram continuous illustrating a message flow according to an embodiment.

FIG. 4 and FIG. 5 are message flow diagrams illustrating a message flow according to an embodiment. The message flow may begin with a SOR-AF 410 transmitting to UDM 408 a subscribing request message 401 (e.g., a Nudm_EventExposure_Subscribe request message) to subscribe ROAMING_STATUS event for a UE from UDM. As SoR is very dynamic and depends on location and time-of-day etc., the event report mode could be set to periodical reporting or one-time reporting on event detection, so if a UE is in roaming, SoR-AF 410 can receive periodical report, and if this periodical period needs to be updated such as to make the report more frequent, SoR-AF 410 could update the event subscription towards UDM 408 with a smaller report period. The SoR-AF 410 may receive from the UDM a response 403 of acknowledge the subscribing request (i.e., Nudm_EventExposure_Subscribe response).

The message flow also includes, when the UE is roaming, the SOR-AF 410 receiving a roaming status reporting notify message 405 (e.g., a Nudm_EventExposure_Notify request) from the UDM 408. The notify message comprises roaming status reporting information. The roaming status reporting information includes a new serving PLMN, Identifier (Id), an access type of a UE (402) for accessing the new serving PLMN identified by the PLMN Id, and a roaming indication which indicates the new serving PLMN is different from the Home PLMN (HPLMN) or not. In one embodiment, the access type may be a 3rd Generation Partnership Project, 3GPP, access or non-3GPP access. The SoR-AF 410 acknowledges the Nudm_EventExposure_Notify request with a Nudm_EventExposure_Notify response 407. The SOR-AF 410 generates 409 an updated steering of roaming information based on the received roaming status reporting information including the access type, the new serving PLMN Id and the roaming indication. In one embodiment, the SOR-AF 410 may generate the updated steering of roaming information optionally based on a region area retrieved from location procedures and time-of-day. The updated steering of roaming information comprises a new list of preferred PLMN/access technology combinations. The SOR-AF 410 transmits to UDM 408 a parameter provision update request message 411 (i.e., Nudm_ParameterProvision_Update request) and receives the response 413 (i.e., Nudm_ParameterProvision_Update response) from the UDM 408. The update request message comprises the updated steering of roaming information.

In one embodiment the roaming status reporting information is of a type that is an extension of the RoamingStatusReport type defined in TS 29.503. For example, the roaming status reporting information may include the following information elements (IEs):

| Attribute name | Data type | P | Cardinality | Description |
|---|---|---|---|---|
| roaming | boolean | M | 1 | True: The new serving PLMN is different from the HPLMN; False: The new serving PLMN is the HPLMN |
| newServingPlmn | PlmnId | M | 1 | the new Serving PLMN |
| accessType | AccessType | O | 0 . . . 1 | The access type used for accessing the new Serving PLMN This information may be used by SoR-AF to generate updated SoR information for the UE |

Nudm_EE API

```
openapi: 3.0.0
info:
  version: '1.2. 0-alpha. 3'
  title: 'Nudm_EE'
  description: |
    Nudm Event Exposure Service.
    © 2021, 3GPP Organizational Partners (ARIB, ATIS, CCSA, ETSI, TSDSI, TTA, TTC).
    All rights reserved.
externalDocs:
  description: 3GPP TS 29.503 Unified Data Management Services, version 17.3.0
  url: 'http://www.3gpp.org/ftp/Specs/archive/29_series/29.503/'
  ...
    RoamingStatusReport:
      type: object
      required:
        - roaming
        - newServingPlmn
      properties:
        roaming:
          type:
            boolean
        newServingPlmn:
          $ref: 'TS29571_CommonData.yaml#/components/schemas/PlmnId'
        accessType:
          $ref: 'TS29571_CommonData.yaml#/components/schemas/AccessType'
   ...
    RevokedCause:
      anyOf:
        - type: string
          enum:
          - NOT_ALLOWED
        - type: string
```

Accordingly, in one embodiment, a new information element (IE), preferably called "accessType," is added to the RoamingStatusReport to indicate the access type for the new Serving PLMN and this information is used by SoR-AF to generate updated SoR information for the UE. In one embodiment, the access type with value 3GPP access or non-3GPP access indicates whether the access is via 3GPP or via non-3GPP. Steering of Roaming information contains list of preferred PLMN/access technology combinations. One priority value for each PLMN/access technology combination is added to indicate the priority for the HPLMN prefer the UE to select. The priority value for each PLMN/access technology combination may be impacted by adding the access type being an input to generate the list of preferred PLMN/access technology combinations. In one embodiment, SoR-AF may receive roaming status reports with access type (3GPP access), then the PLMN(s) which support the 3GPP access technology (i.e., NG-RAN) will have higher priority and prefer to be selected firstly for the UE. In this way, it optimizes the steering of roaming.

In one embodiment, the UDM 408 may transmit to the SP-AP 412 a message 415 (i.e., Nspaf SecuredPacket_Provide request) including the new list of preferred PLMN/access technology combinations to request it to provide this information in a secured packet if the list of preferred PLMN/access technology combinations is not in secured packet yet. The UDM 408 may receive from the SP-AP 412 a response message 417 (i.e., Nspaf_SecuredPacket_Provide response) including the secured packet for the list of preferred PLMN/access technology combinations. The step 415 and 417 may be done by between SoR-AF and SP-AF, if that the SoR information sent from SoR-AF to UDM in step 411 is already in secured packet, step 415 and 417 between UDM and SP-AF may be skipped.

The message flow also includes the UDM 408 transmitting the updated steering of roaming information including the new list of preferred PLMN/access technology combinations to the UE 402 via AMF 406 and RAN 404 by the message 419 and 423, for example, Nudm_SDM_Notification request between the UDM 408 and AMF 406, and DL NAS TRANSPORT between the UE 402 and AMF 406. The AMF 406 may send the response (i.e., Nudm_SDM_Notification response) to the UDM 408 to acknowledge the Nudm_SDM_Notification request.

In one embodiment, the UE 402 may perform a security check 425 on the steering of roaming information included in the DL NAS TRANSPORT message upon receiving the steering of roaming information to verify that the steering of roaming information is provided by HPLMN. The UE 402 sends a UL NAS TRANSPORT message 427 to the AMF 406 for the acknowledge of steering of roaming information reception. The AMF 406 sends Nudm_SDM_Info request 429 to the UDM 408 for acknowledge of steering of roaming information reception. And the UDM 408 acknowledges the Nudm_SDM_Info request with a response 431 (i.e., Nudm_SDM_Info response). The UDM 408 sends to SOR-AF 610 a Nsoraf_SoR_Info request 433 to inform the SOR-AF 410 about successful delivery of the list of preferred PLMN/access technology combinations. And SoR-AF 610 acknowledges the Nsoraf_SoR_Info with a response 435 (Nsoraf_SoR_Info response).

The message flow also includes the UE 402 performing PLMN selection based on the received updated SoR information 437. If the selected PLMN is a VPLMN, the security check is successful and if the UE has a list of available PLMNs in the area and based on this list the UE determines that there is a higher priority PLMN than the selected VPLMN and the UE is in automatic network selection mode, then the UE shall attempt to obtain service on a higher priority PLMN. If the selected PLMN is a VPLMN, the security check is not successful and the UE is in automatic network selection mode, then the UE shall wait until it moves to idle mode or 5GMM-CONNECTED mode with RRC inactive indication before attempting to obtain service on a higher priority PLMN by acting as if timer T that controls periodic attempts has expired, with an exception that the current PLMN is considered as lowest priority. If the selected PLMN is a VPLMN and the UE has an established emergency PDU session, then the UE shall attempt to perform the PLMN selection after the emergency PDU session is released. If the selected PLMN is the HPLMN, regardless whether the UE is in automatic network selection mode or manual network selection mode, regardless whether the UE has an established emergency PDU session or not, and regardless whether the security check is successful or not successful, the UE is not required to perform the PLMN selection.

Figure 6:
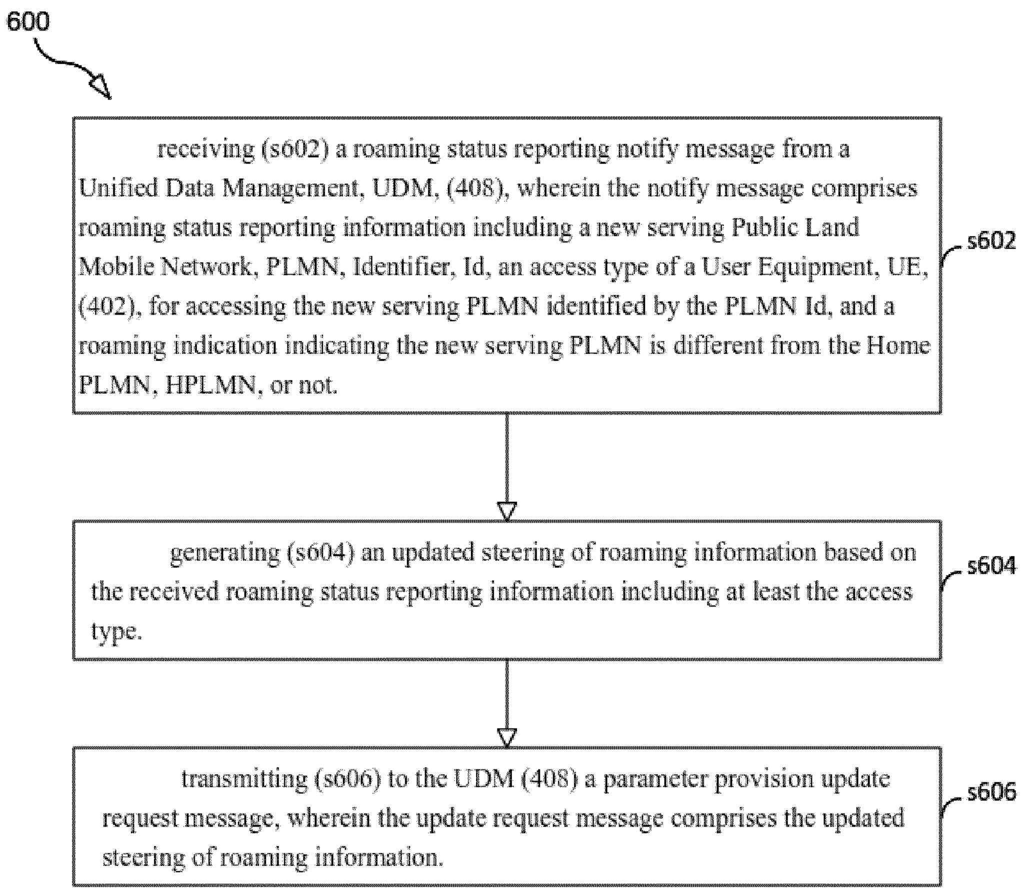
FIG. 6 is a flowchart illustrating a process according to an embodiment.

FIG. 6 is a flowchart illustrating a process 600 according to an embodiment. Process 600 is performed by SOR-AF 610 and may begin in step s602. The process comprises receiving (step s602) a roaming status reporting notify message from a UDM (408); generating (s604) an updated steering of roaming information based on the received roaming status reporting information including at least the access type; and transmitting (s606) to the UDM (408) a parameter provision update request message which comprises the updated steering of roaming information. The notify message (i.e., message 405) comprises roaming status reporting information including a new serving PLMN Id, an access type of a UE (402) for accessing the new serving PLMN identified by the PLMN Id, and a roaming indication indicating the new serving PLMN is different from the Home PLMN or not.

In some embodiments, the access type of the UE (402) for accessing the new serving PLMN identified by the PLMN Id is 3rd Generation Partnership Project, 3GPP, access or non-3GPP access. In some embodiments, the generating the updated steering of roaming information is optionally based on a region area retrieved from location procedures and time-of-day. In some embodiments, the updated steering of roaming information comprises a new list of preferred PLMN/access technology combinations. In some embodiments, the SOR-AF 610 may subscribe the subscriber roaming status event from UDM (408) for periodical reporting or one-time reporting on event detection; and receives the roaming status reporting notify message from the UDM (408) periodically or one time on event detection.

Figure 7:
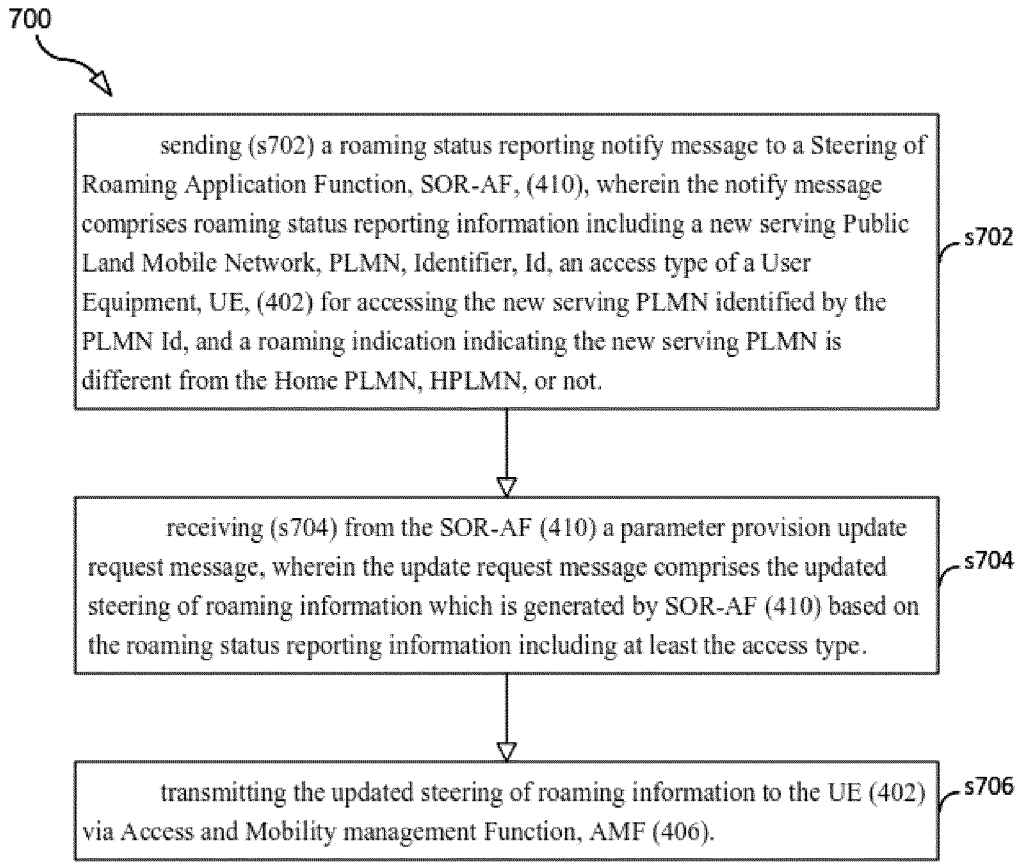
FIG. 7 is a flowchart illustrating a process according to an embodiment.

FIG. 7 is a flowchart illustrating a process 700 according to an embodiment. Process 700 is performed by a UDM 408 and may begin in step s702. The process comprises sending (step s702) a roaming status reporting notify message (i.e., message 405) to a SOR-AF (410); receiving (s704) from the SOR-AF (410) a parameter provision update request message (i.e., message 411) which comprises the updated steering of roaming information generated by SOR-AF (410) based on the roaming status reporting information including at least the access type; and transmitting (step s706) the updated steering of roaming information to the UE (402) via Access and Mobility management Function, AMF (406) (i.e., message 419, 323).

In some embodiments, the access type of the UE (402) for accessing the new serving PLMN identified by the PLMN Id is 3GPP access or non-3GPP access. In some embodiments. In some embodiments, the updated steering of roaming information comprises a new list of preferred PLMN/access technology combinations. In some embodiments, the UDM (408) may receive the subscribing the subscriber roaming status event message from the SOR-AF 610 for periodical reporting or one-time reporting on event detection; and may send the roaming status reporting notify message to SOR-AF 610 periodically or one time on event detection.

Figure 8:
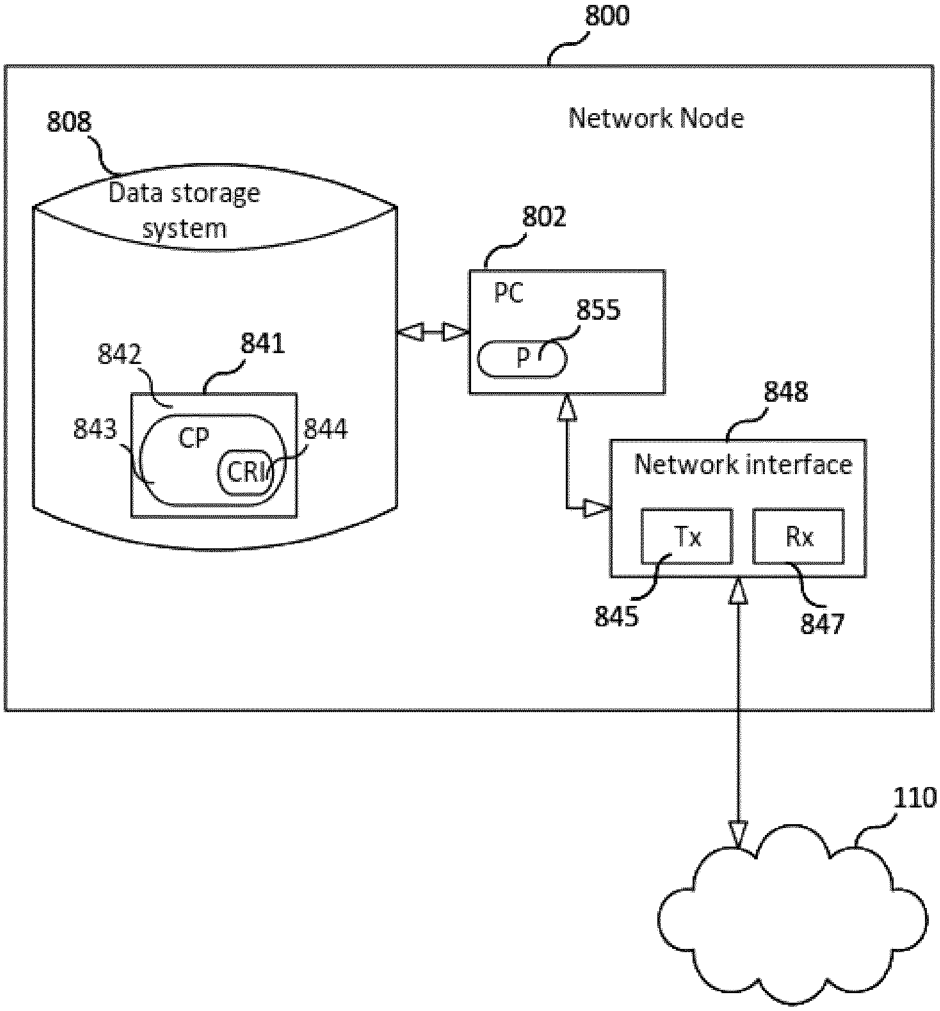
FIG. 8 illustrates a network node according to an embodiment.

FIG. 8 is a block diagram of a network node 800, according to some embodiments, which can be used to implement SOR-AF 610, and/or UDM 408. For instance, in embodiments where SOR-AF 610, and/or UDM 408 consists of software, network node 800 may run (or execute a virtual machine that runs) SOR-AF 610, and/or UDM 408. As shown in FIG. 8, network node 800 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node 800 may be a distributed computing apparatus); a network interface 848 comprising a transmitter (Tx) 845 and a receiver (Rx) 847 for enabling network node 800 to transmit data to and receive data from other machines connected to a network 110 (e.g., an Internet Protocol (IP) network) to which network interface 848 is connected (directly or indirectly) (e.g., network interface 848 may be wirelessly connected to the network 110, in which case network interface 848 is connected to an antenna arrangement); and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable storage medium (CRSM) 842 storing a computer program (CP) 843 comprising computer readable instructions (CRI) 844. CRSM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes network node 800 to perform steps described herein (e.g., steps described herein with reference to the flow charts). In other embodiments, network node 800 may be configured to perform steps described herein without the need for code. That is, for example, PC 802 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a steering of roaming application function (SOR-AF), the method comprising:

the SOR-AF transmitting to a unified data management (UDM) a subscribe message for requesting to subscribe to a roaming status event for a user equipment (UE); and after requesting to subscribe to the roaming status event for the UE, the SOR-AF receiving, from the UDM, a roaming status report, wherein the roaming status report comprises:

i) a Public Land Mobile Network (PLMN) identifier identifying a serving PLMN, ii) an access type identifier identifying an access type, and iii) a boolean roaming indicator indicating a) that the serving PLMN is different from a home PLMN (HPLM) or b) that the serving PLMN is the HPLMN.

2. The method of claim 1, wherein the method further comprises:

generating updated steering of roaming information based on the access type identifier included in the roaming status report; and transmitting to the UDM a parameter provision update request message comprising the updated steering of roaming information, and the updated steering of roaming information comprises a new list of preferred PLMN/access technology combinations.

3. The method of claim 1, wherein the method further comprises:

generating updated steering of roaming information based on the access type identifier included in the roaming status report; and transmitting to the UDM a parameter provision update request message comprising the updated steering of roaming information, and generating the updated steering of roaming information is based on a region area retrieved from location procedures and time-of-day.

4. The method of claim 1, wherein the subscribe message indicates a request for periodical reporting or one-time reporting on event detection.

5. The method of claim 1, wherein receiving the roaming status report comprises receiving a monitoring report comprising:

i) the roaming status report; and ii) an event identifier specifying that the monitoring report comprises the roaming status report.

6. The method of claim 1, wherein the access type identified by the access type identifier is 3rd Generation Partnership Project (3GPP) access, or the access type identified by the access type identifier is non-3GPP access.

7. A method performed by a Unified Data Management (UDM) for steering of roaming, the method comprising:

receiving from a Steering of Roaming Application Function (SOR-AF) a subscribe message indicating that the SOR-AF is requesting to subscribe to a roaming status event for a user equipment (UE); and after receiving the subscribe message, sending a roaming status report to the SOR-AF, wherein the roaming status report comprises:

i) a Public Land Mobile Network (PLMN) identifier identifying a serving PLMN, ii) an access type identifier identifying an access type, and iii) a boolean roaming indicator indicating a) that the serving PLMN is different from a home PLMN (HPLM) or b) that the serving PLMN is the HPLMN.

8. The method of claim 7, wherein the method further comprises:

receiving from the SOR-AF a parameter provision update request message comprising updated steering of roaming information generated by SOR-AF based on the access type identifier included in the roaming status report; and transmitting the updated steering of roaming information to the UE via an Access and Mobility management Function (AMF), and the updated steering of roaming information comprises a new list of preferred PLMN/access technology combinations.

9. The method of claim 7, wherein the subscribe message indicates a request for periodical reporting or one-time reporting on event detection.

10. The method of claim 7, sending the roaming status report to the SOR-AF comprises sending to the SOR-AF a monitoring report comprising:

i) the roaming status report; and ii) an event identifier specifying that the monitoring report comprises the roaming status report.

11. The method of claim 7, wherein the access type identified by the access type identifier is 3rd Generation Partnership Project (3GPP) access, or the access type identified by the access type identifier is non-3GPP access.

12. A network node for steering of roaming, the network node comprising:

processing circuitry; and a memory containing instructions executable by the processing circuitry, wherein the network node is operable to perform a method comprising:

transmitting to a unified data management (UDM) a subscribe message for requesting to subscribe to a roaming status event for a user equipment (UE); and after requesting to subscribe to the roaming status event for the UE, obtaining a roaming status report sent by the UDM, wherein the roaming status report comprises:

i) a Public Land Mobile Network (PLMN) identifier identifying a serving PLMN, ii) an access type identifier identifying an access type, and iii) a boolean roaming indicator indicating a) that the serving PLMN is different from a home PLMN (HPLM) or b) that the serving PLMN is the HPLMN.

13. The network node of claim 12, wherein the method further comprises:

generating updated steering of roaming information based on the access type identifier included in the roaming status report; and transmitting to the UDM a parameter provision update request message comprising the updated steering of roaming information, and the updated steering of roaming information comprises a new list of preferred PLMN/access technology combinations.

14. The network node of claim 12, wherein the method further comprises:

generating updated steering of roaming information based on the access type identifier included in the roaming status report; and transmitting to the UDM a parameter provision update request message comprising the updated steering of roaming information, and generating the updated steering of roaming information is based on a region area retrieved from location procedures and time-of-day.

15. The network node of claim 12, wherein the subscribe message indicates a request for periodical reporting or one-time reporting on event detection.

16. The network node of claim 12, wherein obtaining the roaming status report comprises:

a) receiving a monitoring report comprising:

i) the roaming status report; and ii) an event identifier specifying that the monitoring report comprises the roaming status report; and b) obtaining the roaming status report from the monitoring report.

17. The network node of claim 12, wherein the access type identified by the access type identifier is 3rd Generation Partnership Project (3GPP) access, or the access type identified by the access type identifier is non-3GPP access.

* * * * *